Aug. 25, 1970    J. B. KRIPKE ET AL    3,525,413

SEPARABLE BODY AND FRAME ARRANGEMENT

Filed Aug. 30, 1968    2 Sheets-Sheet 1

INVENTORS
Joseph B. Kripke,
Arthur B. Mace, &
Byron E. Voight

Herbert Furman
ATTORNEY

United States Patent Office 3,525,413
Patented Aug. 25, 1970

3,525,413
SEPARABLE BODY AND FRAME ARRANGEMENT
Joseph B. Kripke, Birmingham, Arthur B. Mace, Warren, and Byron E. Voight, Pleasant Ridge, Mich., assignors to General Motors Corporation, Detroit, Mich., a corporation of Delaware
Filed Aug. 30, 1968, Ser. No. 756,456
Int. Cl. B60r 21/00; B62d 39/00
U.S. Cl. 180—82
4 Claims

ABSTRACT OF THE DISCLOSURE

A pair of struts extend between the body fire wall and forward frame rails and are pivoted to each by socket joints. Upon relative movement between the frame and body, the struts elevate the body so that the transmission of the power plant moves underneath the fire wall.

---

This invention relates to vehicles of the body and frame type and more particularly to strut means interconnecting a vehicle body and frame for elevating a body wall to permit a power plant to move underneath the body wall under impact conditions.

Conventionally, the transmission unit of a vehicle power plant extends partially under the forward body wall, commonly known as the dash panel or fire wall, and is housed within a recess in the body wall and floor pan. Under certain front impact conditions, the power plant moves rearwardly so that the transmission damages the fire wall and the floor pan.

This invention provides strut means interconnecting the body and frame to elevate the body and particularly the forward wall thereof under certain front impact conditions so that the transmission moves underneath the body wall without any engagement and resultant damage.

Generally, the body is secured to the frame by releasable connections, such as shearable bolts. A pair of struts extend forwardly and downwardly between the body wall and the front frame rails. The ends of each strut include a ball receiving socket and like sockets are mounted on the body wall and frame so that the balls are received within both sockets and are substantially completely housed therewithin. The sockets are releasably connected so that normally the struts provide a rigid connection between the body wall and the frame. Upon front impact conditions sufficient to move the front portions of the frame rails and/or the remainder of the frame rearwardly relative to the body, the releasable connections between the sockets are broken, and the struts swing rearwardly and downwardly to elevate the forward portion of the body so that the transmission can move rearwardly and underneath the forward body wall and floor pan without consequent damage. The releasable connections between the body and frame are broken by either the movement of the frame or the elevation of the body.

Under normal operating and impact conditions, the struts provide rigid connections between the body and the frame.

The primary object of this invention is to provide a vehicle of the body and frame type wherein the body is elevated under certain impact conditions to permit a portion of the vehicle power plant to move underneath a body wall. Another object of this invention is to provide a vehicle of the body and frame type wherein strut means are provided between an end of the body and the frame to elevate the end of the body under certain impact conditions and permit a portion of the vehicle power plant to move underneath a body end wall. A further object of this invention is to provide a pair of struts interconnecting a body wall and a vehicle frame for elevating the body wall upon relative movement between the body and frame to thereby permit a portion of an adjacent vehicle power plant to pass underneath the body wall. Yet another object of this invention is to provide such a pair of structs which normally provide a rigid connection between the body and the frame but which provide a pivotal connection upon certain impact conditions.

These and other objects of the invention will be readily apparent from the following specification and drawings wherein.

Figure 1:
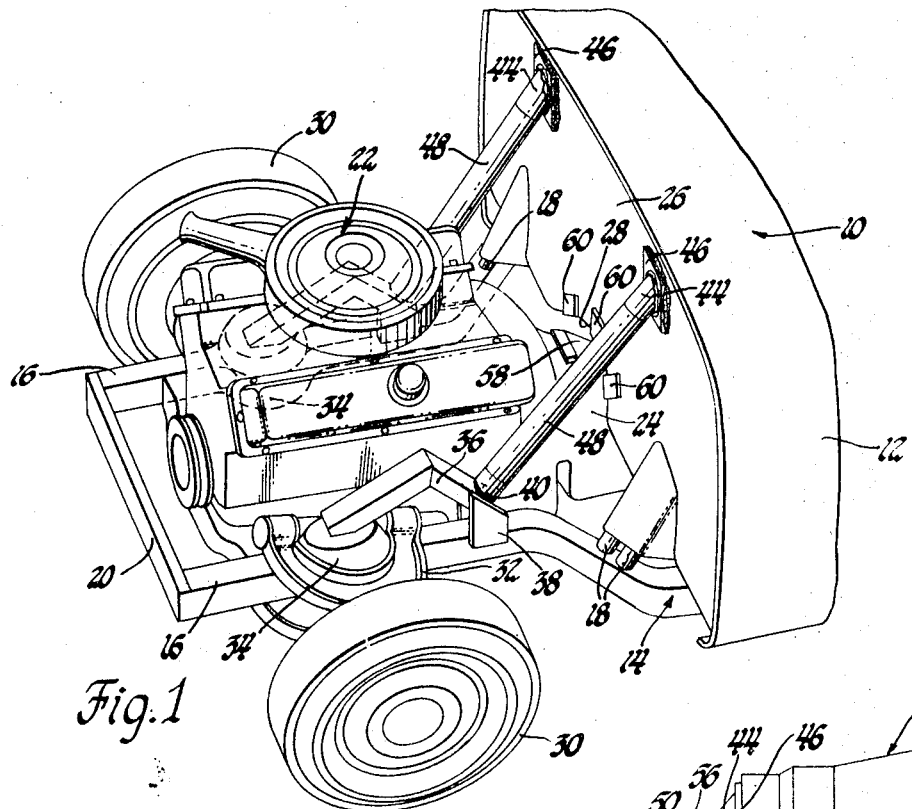
FIG. 1 is a partial perspective view of a vehicle according to this invention.
Figure 2:
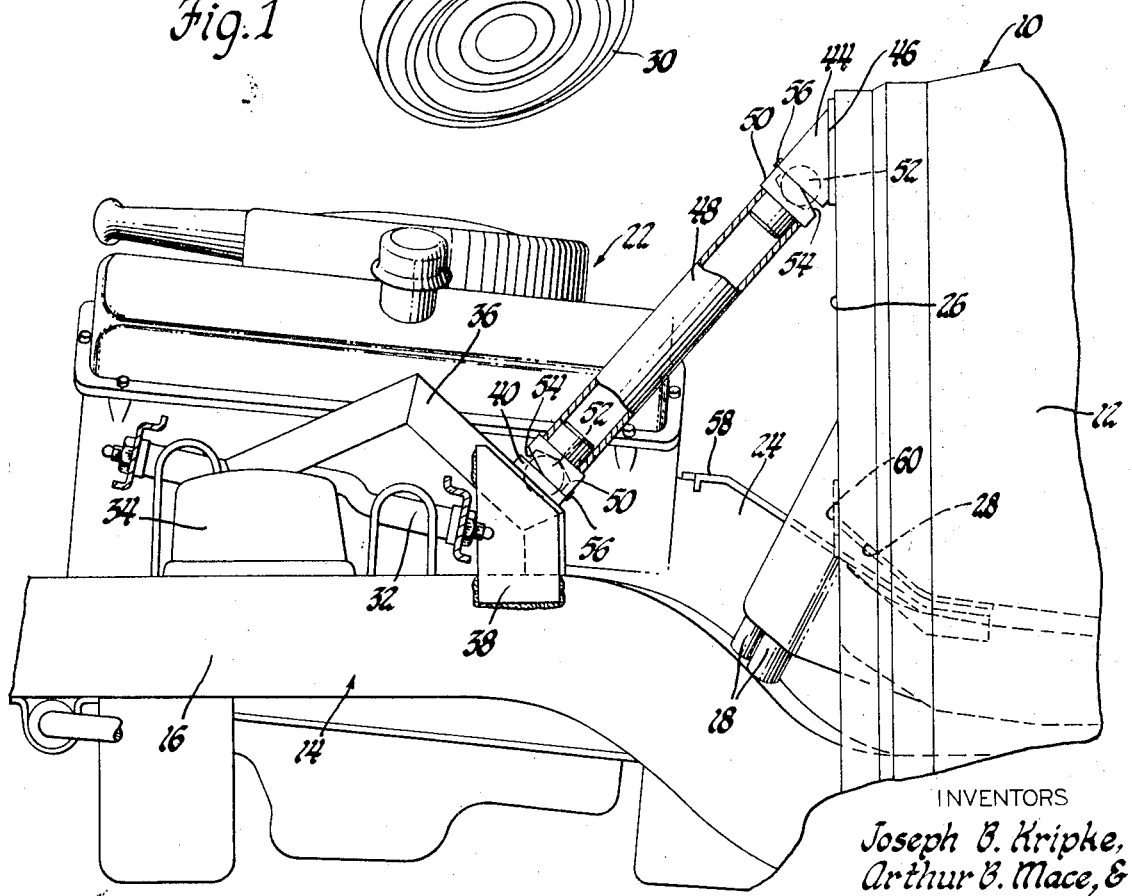
FIG. 2 is an enlarged partially broken away partial side elevational view of the vehicle under normal operating conditions.

Referring now particularly to FIG. 1 of the drawings, a vehicle designated generally 10 includes a conventional vehicle body 12 supported on a conventional vehicle frame 14. The body is secured to the frame rails 16 by a number of releasable connections, not shown, which release the body from the frame upon relative longitudinal and/or lateral movement therebetween. The shearable bolts 18 connect the body to the forward portions of the rails 16 and shear upon collapse of these portions of the rails or relative longitudinal movement between the body and frame. The front portions of rails 16 are interconnected by a forward cross rail 20 and, as is conventional, by other cross rails, not shown. A conventional vehicle power plant 22 is conventionally mounted on the forward portions of the rails 16 and also on the conventional cross rails, not shown. The power plant 22 includes a transmission 24 which extends rearwardly and partially underneath a forward body wall 26 which is conventionally known as the dash panel or fire wall. The dash panel is provided with an arcuate recess or housing 28, FIG. 1, to house the transmission. Housing 28 leads into a conventional tunnel housing in the body floor pan to house the drive line to the rear wheels.

The front wheels 30 are conventionally supported by independent type front wheel suspensions 32 of a conventional nature. Each suspension includes an upper spring seat or cap 34 conventionally mounted on a rail 16.

In accordance with this invention, a triangular shaped brace 36 of channel cross section extends between each spring cap 34 and each rail 16, with the brace having its forward end welded to the cap 34 and its rearward end welded to the rail 16 and reinforced by side plates 38. A ball socket 40 is welded or otherwise secured to the intermediate leg of each brace 36. The sockets open rearwardly and upwardly of the body.

A pair of spaced ball sockets 44 have their mounting pads 46 welded to the wall 26 adjacent the upper edge thereof. Each socket 44 opens forwardly and downwardly of the body in alignment with a ball socket 40. A tubular strut 48 extends between each pair of sockets 40 and 44. The reduced diameter shank of a ball socket 50 is fitted into each end of each strut and welded thereto. All of the sockets 50 are of the same construction. A ball 52 fits within each pair of sockets 40 and 50 and 44 and 50 to pivotally interconnect each strut and the body and frame. The periphery or edge of each socket 50 is cut away at 54 for approximately half the extent thereof, with the cutaway portions being arranged diametrically opposite of each other axially of the strut. The remainder of the periphery or edge portion of each socket 50 seats on the periphery or edge of a respective socket 40 or 44 and is releasably secured thereto at 56, such as by tack welding.

Under normal vehicle operating conditions, the struts 48 provide a rigid connection between the body and the frame.

When the forward portion of the vehicle 10 is completed with conventional front end sheet metal, such as fenders, a hood, a radiator, and a bumper, the rail 20 is either positioned immediately behind the bumper or connected to the bumper so that all front impact loads will be applied to the rail 20 with little diminution thereof.

Under a front impact load sufficient to collapse the front portions of rails 16, the bolts 18 are sheared or released and the tack welds 56 are broken so that each strut can pivot about its upper and lower ends relative to the body wall and frame.

Figure 3:
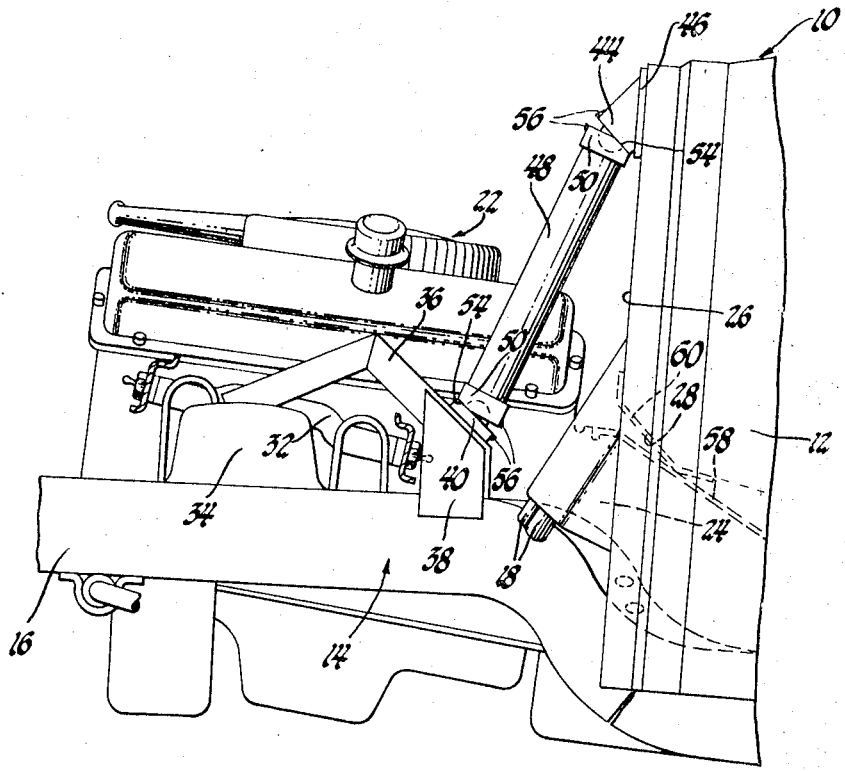
FIG. 3 is a view similar to FIG. 2 showing the struts partially elevating the body.

As the struts initially pivot about the bolts 52, the cutaway portions 54 of the sockets 50 will engage the juxtaposed edge portion of a respective socket 40 and 44 to locate the struts as shown in FIG. 3 and partially elevate the wall 26 of the body with respect to the frame 14 so that the transmission 24 can move rearwardly and underneath the wall 26 and also within the tunnel of the floor pan. During this initial pivotal movement of the struts, the juncture edges between the cutaway portions 54 and the remainder of the edge portions of the sockets 50 act as fulcrums. Any releasable connections, other than the shearable bolts 18, between the body and the frame which are not released upon relative longitudinal movement of the body and the frame caused by the impact load, will be released upon this initial partial elevation of the body with respect to the frame.

Figure 4:
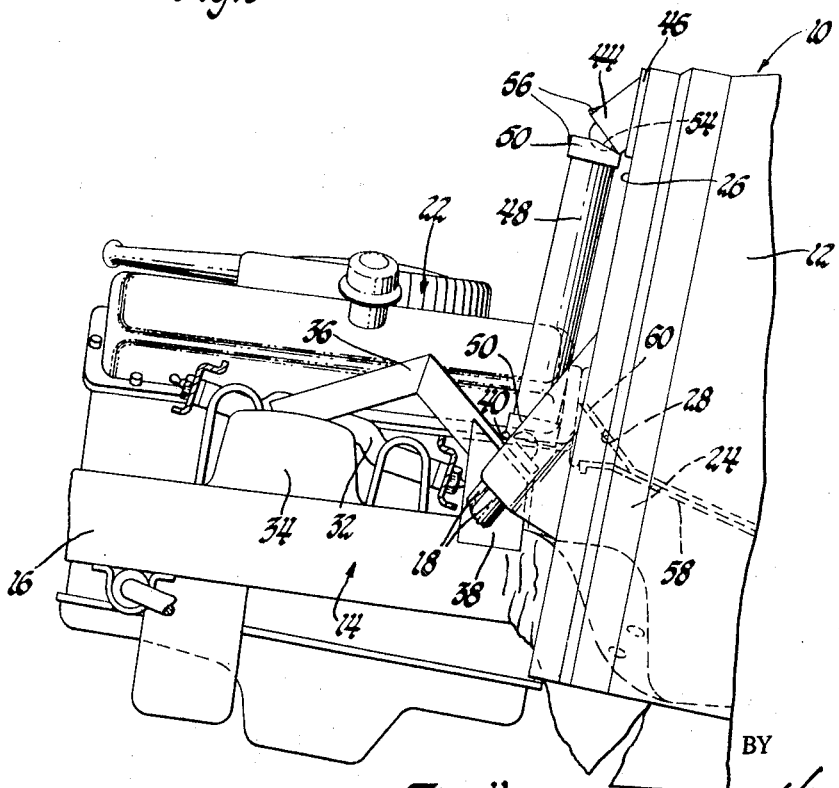
FIG. 4 is a view similar to FIG. 3, showing the struts additionally elevating the body.

If the front impact load is sufficient to collapse the front portions of the rail 16 to a greater extent or move these portions and the remainder of the rails longitudinally relative to the body, the upper and lower ends of the strut will continue to pivot about the balls 52, as shown in FIG. 4. The cutaway portions 54 will swing away and out of engagement with the edge portions of the respective sockets 40 and 44, except for limited edge engagement therebetween, as the struts 48 swing further rearwardly and downwardly to thereby further elevate the body wall 26 with respect to the frame 14 so that substantially the entire transmission assembly 24 can move underneath the body wall 26 and within the floor pan tunnel without any consequent damage.

By providing ball and socket connections between each strut and the body wall and frame, each strut can easily pivot about its respective connections without loss of an operative connection. If there is limited lateral misalignment between the body and the frame during impact conditions, this is accommodated by the struts without loss of an operative connection to thereby assure that the body will be elevated under such misalignment. The engagement of the braces 36 with the wall 26, as shown in FIG. 4, limits pivoting movement of the struts.

As best shown in FIG. 1, a skid plate 58 is provided on the transmission 24 and one or more skid plates 60 are provided on the wall of the recess 28 for engagement with each other during movement of the transmission underneath the wall 26 to additionally provide for such movement without damage.

Although the invention has been shown and described in connection with a front engine vehicle, it is believed apparent that the invention will be equally applicable to rear engine driven vehicles wherein the power plant extends partially under a rear body wall.

We claim:

1. In a vehicle having a frame including a pair of generally longitudinally extending spaced frame rails, a power plant and transmission assembly mounted on the frame and located between the rails, and a body supported on the frame rails and having a generally vertically disposed body wall extending above the rails and located adjacent the power plant and transmission assembly, the combination comprising, releasable means securing the body to the frame, a pair of rigid struts extending angularly between the upper portion of the body wall and the frame rails, a pair of first pivotal joints, each pivotally interconnecting the upper end of one strut and the upper portion of the body wall, a pair of second pivotal joints, each pivotally interconnecting the lower end of one strut and one of the rails, the first and second pivotal joints of each strut being vertically offset relative to each other longitudinally of the body, an impact force on the frame sufficient to move the second pivotal joints longitudinally toward the first pivotal joints and the body wall pivoting the struts relative ot the frame rails and body wall and releasing the releasable means to elevate the body wall relative to the frame rails and permit movement of the power plant and transmission assembly underneath the body wall.

2. In a vehicle having a frame including a pair of generally longitudinally extending spaced frame rails, a power plant and transmission assembly mounted on the frame and located between the rails, and a body supported on the frame rails and having a generally vertically disposed body wall extending above the rails and located adjacent the power plant and transmission assembly, the combination comprising, releasable means securing the body to the frame, a pair of rigid struts extending angularly between the upper portion of the body wall and the frame rails, a pair of first pivotal joints, each pivotally interconnecting the upper end of one strut and the upper portion of the body wall, a pair of second pivotal joints, each pivotally interconnecting the lower end of one strut and one of the rails, the first and second pivotal joints of each strut being vertically offset relative to each other longitudinally of the body, an impact force on the frame sufficient to move the second pivotal joints longitudinally toward the first pivotal joints and the body wall pivoting the struts relative to the frame rails and body wall and releasing the releasable means to elevate the body wall relative to the frame rails and permit movement of the power plant and transmission assembly underneath the body wall, and second releasable means normally rigidly connecting the struts to the body wall and frame rails, the second releasable means being releasable upon pivotal movement of the struts relative to the body wall and frame rails.

3. In a vehicle having a frame including a pair of generally longitudinally extending spaced frame rails, a power plant and transmission assembly mounted on the frame and located between the rails, and a body supported on the frame rails and having a generally vertically disposed body wall extending above the rails and located adjacent the power plant and transmission assembly, the combination comprising, releasable means securing the body to the frame, a pair of rigid struts extending angularly between the upper portion of the body wall and the frame rails, a pair of first pivotal joints, each including a socket secured to the upper end of one strut, a socket secured to the upper portion of the body wall, and a ball seating in the socket, a pair of second pivotal joints, each including a socket secured to the lower end of one strut, a socket secured to one of the rails, and a ball seating in the socket, the first and second pivotal joints of each strut being vertically offset relative to each other longitudinally of the body, an impact force on the frame sufficient to move the rail sockets longitudinally toward the body wall sockets pivoting the struts and strut sockets relative to the rails and body wall sockets and releasing the releasable means to elevate the body wall relative to the frame rails and permit movement of the power plant and transmission assembly underneath the body wall.

4. In a vehicle having a frame including a pair of generally longitudinally extending spaced frame rails, a power plant and transmission assembly mounted on the frame and located between the rails, and a body supported on the frame rails and having a generally vertically disposed body wall extending above the rails and located adjacent the power plant and transmission assembly, the combination comprising, releasable means securing the body to the frame, a pair of rigid struts extending angularly between the upper portion of the body wall and the frame rails, a pair of pivotal joints pivotally interconnecting the upper end of each strut and the upper portion of the body wall and the lower end of each strut and one of the rails, the pivotal joints of each strut being vertically offset relative to each other longitudinally of the body, each joint including a pair of sockets opening to each other and seating a ball, the sockets having seated edge portions, an edge portion of one socket of each joint being cut away to permit pivotal movement of the sockets in one direction relative to each other, an impact force on the frame sufficient to move the rail sockets longitudinally toward the body wall sockets pivoting the struts and strut sockets relative to the frame rail sockets and body wall sockets and releasing the releasable means to elevate the body wall relative to the frame rails and permit movement of the power plant and transmission assembly underneath the body wall.

References Cited

UNITED STATES PATENTS

| | | |
|---|---|---|
| 2,193,949 | 3/1940 | Tibbetts. |
| 2,517,860 | 8/1950 | Forgy _____ 244—1 |
| 2,896,735 | 7/1959 | Bohn _____ 180—92 |
| 2,900,036 | 8/1959 | Blake _____ 180—82 |
| 2,929,637 | 3/1960 | Papacosta. |
| 3,162,479 | 12/1964 | Hewitt _____ 296—35 |
| 3,331,460 | 7/1967 | Bacon _____ 180—1 |

KENNETH H. BETTS, Primary Examiner

U.S. Cl. X.R.

180—64, 91; 280—106